United States Patent
Chen et al.

(10) Patent No.: US 11,297,774 B2
(45) Date of Patent: Apr. 12, 2022

(54) LIGHTING DEVICE FOR PLANT GROWTH

(71) Applicant: SOLIDLITE CORP., Hsinchu County (TW)

(72) Inventors: Hsing Chen, Hsinchu County (TW); Wei-Hao Chen, Hsinchu County (TW); Hsun-Yu Shih, Hsinchu County (TW)

(73) Assignee: Solidite Corp., Hsinchu County (TW)

( * ) Notice: Subject to any disclaimer, the term of this patent is extended or adjusted under 35 U.S.C. 154(b) by 605 days.

(21) Appl. No.: 16/373,845

(22) Filed: Apr. 3, 2019

(65) Prior Publication Data
US 2020/0060096 A1 Feb. 27, 2020

(30) Foreign Application Priority Data
Aug. 24, 2018 (TW) ................. 107129861

(51) Int. Cl.
*A01G 7/04* (2006.01)
*F21V 21/14* (2006.01)
*H05B 45/10* (2020.01)

(52) U.S. Cl.
CPC .............. *A01G 7/045* (2013.01); *F21V 21/14* (2013.01); *H05B 45/10* (2020.01)

(58) Field of Classification Search
CPC ........ A01G 9/249; A01G 31/06; A01G 7/045; A01G 9/247; A01G 13/0212; A01G 2031/006; A01G 22/00; A01G 29/00; A01G 31/02; A01G 31/04; A01G 31/047; A01G 9/0299; A01G 9/143; A01G 9/246; A01G 9/26; F21Y 2115/10; F21Y 2103/33; Y02A 40/25; F21S 9/035; H05B 45/10; H05B 45/12; H05B 47/00; H05B 47/19

See application file for complete search history.

(56) References Cited

U.S. PATENT DOCUMENTS

| | | | |
|---|---|---|---|
| 10,667,468 B1 * | 6/2020 | Tang | H05B 45/12 |
| 2020/0137964 A1 * | 5/2020 | Bouchard | H04W 4/80 |
| 2020/0236865 A1 * | 7/2020 | Travaglini | A01G 9/143 |
| 2021/0185955 A1 * | 6/2021 | Sakaguchi | A01G 31/04 |

* cited by examiner

*Primary Examiner* — Monica C King
(74) *Attorney, Agent, or Firm* — Rosenberg, Klein & Lee (57) ABSTRACT

The present disclosure discloses a lighting device for plant growth, comprising: a lamp, a lifting mechanism, at least two sensing mechanisms and a control mechanism. A light-emitting module is disposed on the bottom surface of the lamp and two ends of the lifting mechanism are coupled to the top surface of the lamp and the control mechanism respectively. Each sensing mechanisms is disposed at the bottom of the lamp. The control mechanism comprises a timing module. When the sensing mechanisms operate that form a signal sensing path and sense a plant to generate a sensing signal, the control mechanism may drive the lifting mechanism according to the sensing signal to control the longitudinal displacement of the lamp. Through the automatic detection and position lifting function, it is possible to provide suitable light sources for plants at different growth stages.

20 Claims, 7 Drawing Sheets

LIGHTING DEVICE FOR PLANT GROWTH

BACKGROUND a) Technical Field

The present disclosure pertains to a lighting device for plant cultivation, particularly to a lighting device having automatic detection and position lifting function that may provide a suitable light source according to the lighting conditions required by the plants at different growth stages. At the same time, the lighting device reduces relative energy cost and detects interferences.

b) Description of the Related Art

Lighting is one of the most important factors for plant cultivation and growth. In principle, the stronger the lighting is, the higher the photosynthesis rate of the plant. How to control the light exposure according to the characteristics of the plant has become the key factor for a successful cultivation.

With the changes of the eras and the rapid development of science and technology, it has a significant impact on agriculture. In recent years, due to the advancement of the light-emitting diode (LED) manufacturing process, the brightness and color temperature of the LED have been greatly improved. It has advantages such as high luminate efficiency, low power consumption and small in size. Therefore, using LEDs as artificial light sources for plant cultivation is popular recently. With the development, many LED related lighting devices for plant cultivation have also been introduced to the market.

But for the moment, regardless of type of the artificial light source used, the lighting device used to control the lighting conditions for the plant may only be fixed at a predetermined position, so that at the early stage of plant growth, the distance between the light source and the plant is too far hence the lighting is insufficient for optimal plant growth. At the later stage of plant growth, it is easy for the plants to suffer from light damages because the light source is too close to the light-receiving plants.

SUMMARY

In view of the above shortcomings of the prior art, the objective of the present disclosure is to provide a lighting device having automatic detection and position lifting function that may provide a suitable light source according to the lighting conditions required by the plants at different growth stages. At the same time, the lighting device reduces relative energy cost and detects interferences.

According to an objective of the present disclosure, a lighting device for plant growth is provided, it comprises: a lamp having a light-emitting module on a bottom surface thereof; a lifting mechanism connecting to a top surface of the lamp; at least two sensing mechanisms disposed at the bottom of the lamp, and the sensing mechanisms and the light-emitting module having a longitudinal separation space therebetween, each of the sensing mechanisms having a transmitter and a receiver configured with displacement, a signal sensing path being formed between the transmitter and the receiver, wherein the two adjacent transmitters having a distance of at least 10 cm therebetween; and a control mechanism being coupled to the lamp, the lifting mechanism and each of the sensing mechanisms, and the control mechanism comprising a timing module, the control mechanism turning on or off each of the sensing mechanisms according to a timed trigger signal generated by the timing module, when the sensing mechanisms operate to form the signal sensing path and sense the plant to generate a sensing signal, the control mechanism drives the lifting mechanism according to the sensing signal to control the longitudinal displacement of the lamp.

According to the above technical features, the at least two sensing mechanisms may be arranged on a same horizontal line.

According to the above technical features, the at least two sensing mechanisms may be arranged on different horizontal lines.

According to the above technical features, the signal sensing paths of the sensing mechanisms are preferably parallel to each other.

According to the above technical features, the number of the sensing mechanisms is in even number and the signal sensing paths for each two of the sensing mechanisms are preferably perpendicular to each other.

According to the above technical features, the number of the sensing mechanisms is in even number and the signal sensing paths for each two of the sensing mechanisms are preferably mutually intersecting.

According to the above technical feature, the light-emitting module comprises at least one light emitting diode.

According to the above technical feature, wherein the light-emitting diodes are in plurality and each of the light emitting diodes radiates at different wavelengths.

According to the above technical feature, wherein the light-emitting diodes are in plurality and the plurality of light emitting diode radiates at the same wavelength.

According to the above technical features, wherein the light emitting diode radiates ultraviolet light.

According to the above technical feature, wherein the wavelength of the ultraviolet light is between 280 nm and 400 nm.

According to the above technical feature, the control mechanism further comprises a light source control module coupled to the lamp to adjust and control the intensity of the light emitted by the light-emitting module.

According to the above technical feature, the control mechanism further comprises: a power module connecting the lamp, the sensing mechanism, the timing module and the light source control module; a control module connecting the lamp, the sensing mechanisms, the timing module, the light source control module and the power module. The control module is capable of receiving the timed trigger signal to turn on or off each sensing mechanisms and the control module is capable of receiving a signal of the light source control module to adjust and control the light of the light-emitting module; and a driving module is coupled to the power module, the control module and the lifting mechanism. When the control module receives the sensing signal, the driving module is being controlled by the control module to drive the lifting mechanism to operate.

As described above, the lighting device for plant growth of the present disclosure may detect the height of the plant by using the sensing mechanism then adjust the position of the lamp through the lifting mechanism, so that the appropriate light source may be provided by the lamp in order to respond to different growth stages of the plant with the required lighting conditions. Furthermore, the timing module may be used to control the operation of the sensing mechanism, thereby reducing the interference of uncertain factors such as people and objects so that the more accurate heights of the plants in the plant growth area may be determined to ensure the lamp lifting up normally. At the same time, relative energy costs is reduced.

DETAILED DESCRIPTION OF THE EMBODIMENTS

In order for the examiner to understand the technical features, content and advantages of the present disclosure and its efficacy, the present disclosure will be described in detail with references to the accompanying drawings. The drawings used are for illustrative and auxiliary purposes only and may not necessarily be the true scale and precise configuration of the present disclosure. Therefore, the scope of the present disclosure should not be limited to and interpreted as the scale and configuration of the attached drawings.

The lighting device for plant growth proposed by the present disclosure can be used to provide a sunlight-like light source for plant cultivation, and adaptively adjust the position of the light source according to the change of height of the plant at different growth stages. Therefore, the lighting conditions for plant at each growth stage may be satisfied. In addition, the present disclosure also has a timed sensing function. Other than reducing occurrences of the false detection, the power consumption may also be reduced. With the controlled light intensity for each light source, the best lighting efficiency and best economic effect may be achieved.

Figure 1:
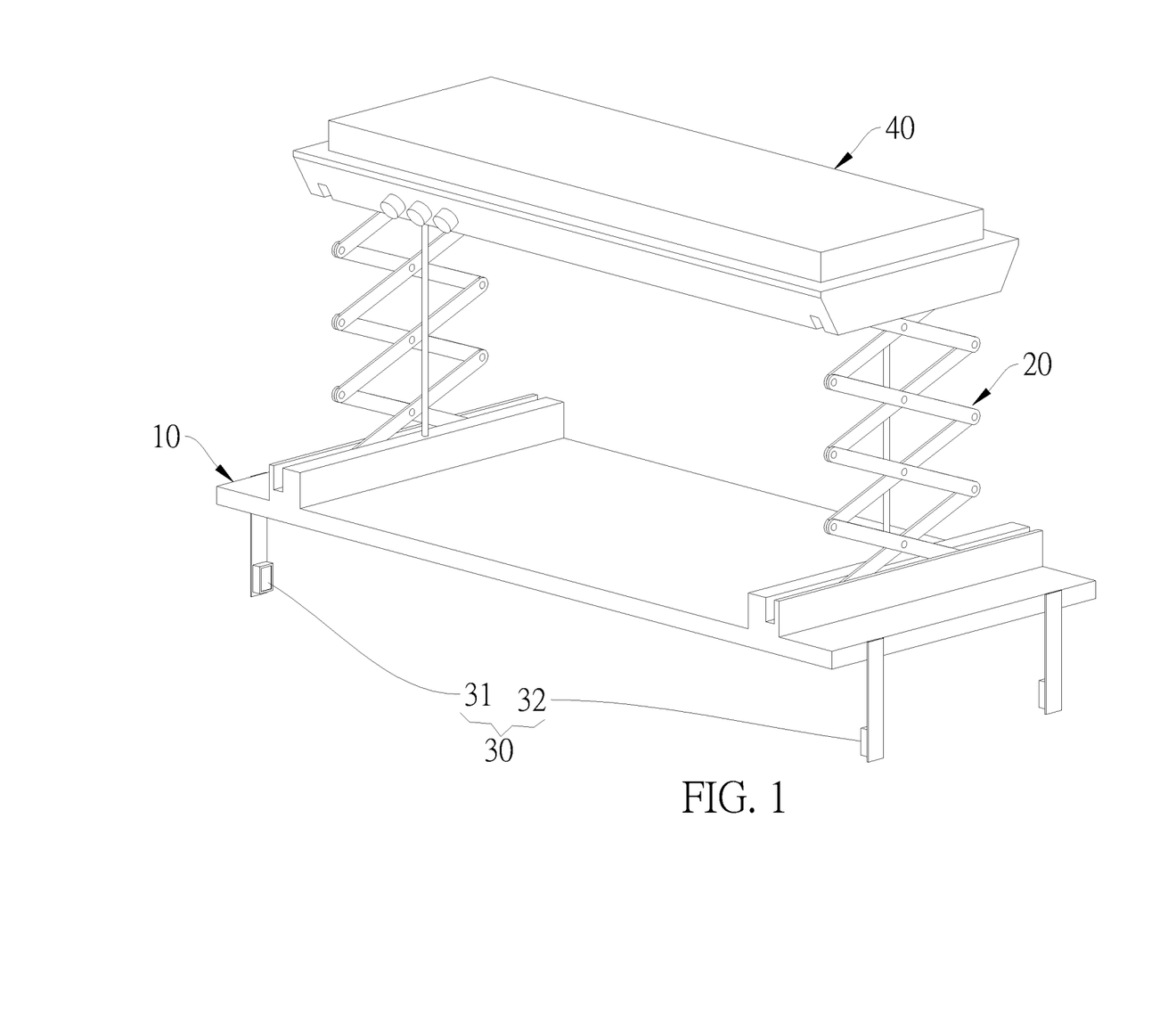
FIG. 1 is a first schematic diagram of a lighting device of plant growth of the present disclosure.
Figure 2:
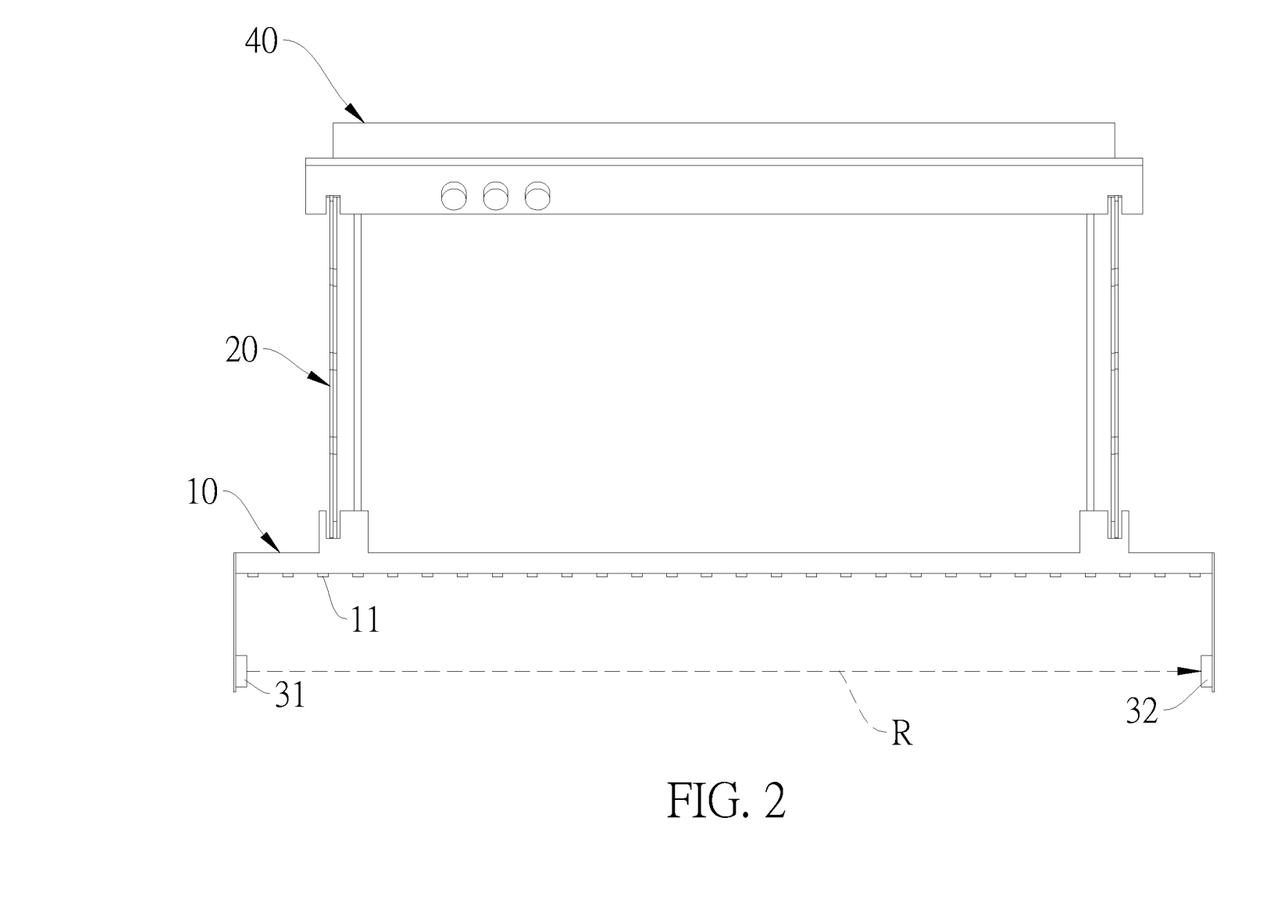
FIG. 2 is a second schematic diagram of the lighting device of plant growth of the present disclosure.

Please refer to both of FIG. 1 and FIG. 2, they are a first schematic diagram and a second schematic diagram of the lighting device for plant growth of the present disclosure respectively. As shown in the figures, the lighting device for plant growth includes a lamp 10, a lifting mechanism 20, at least two sensing mechanisms 30, and a control mechanism 40.

A light-emitting module 11 is disposed at the bottom surface of the lamp 10. The light-emitting module 11 may be in the form of a tube or a bulb. In a preferred embodiment, the light-emitting module 11 may include at least one light emitting diode whereas the light-emitting diodes are in a plurality and the light-emitting diode is capable of emitting light at different wavelengths or same wavelength. Furthermore, the light-emitting diodes 11 radiate ultraviolet light, wherein the wavelength of the UV light ranges from 280 nm to 400 nm.

The lifting mechanism 20 is coupled to the top surface of the lamp 10. The lifting mechanism 20 may be hydraulically driven, and the lamp 10 may be longitudinally displaced via automatic or manual control.

Figure 4:
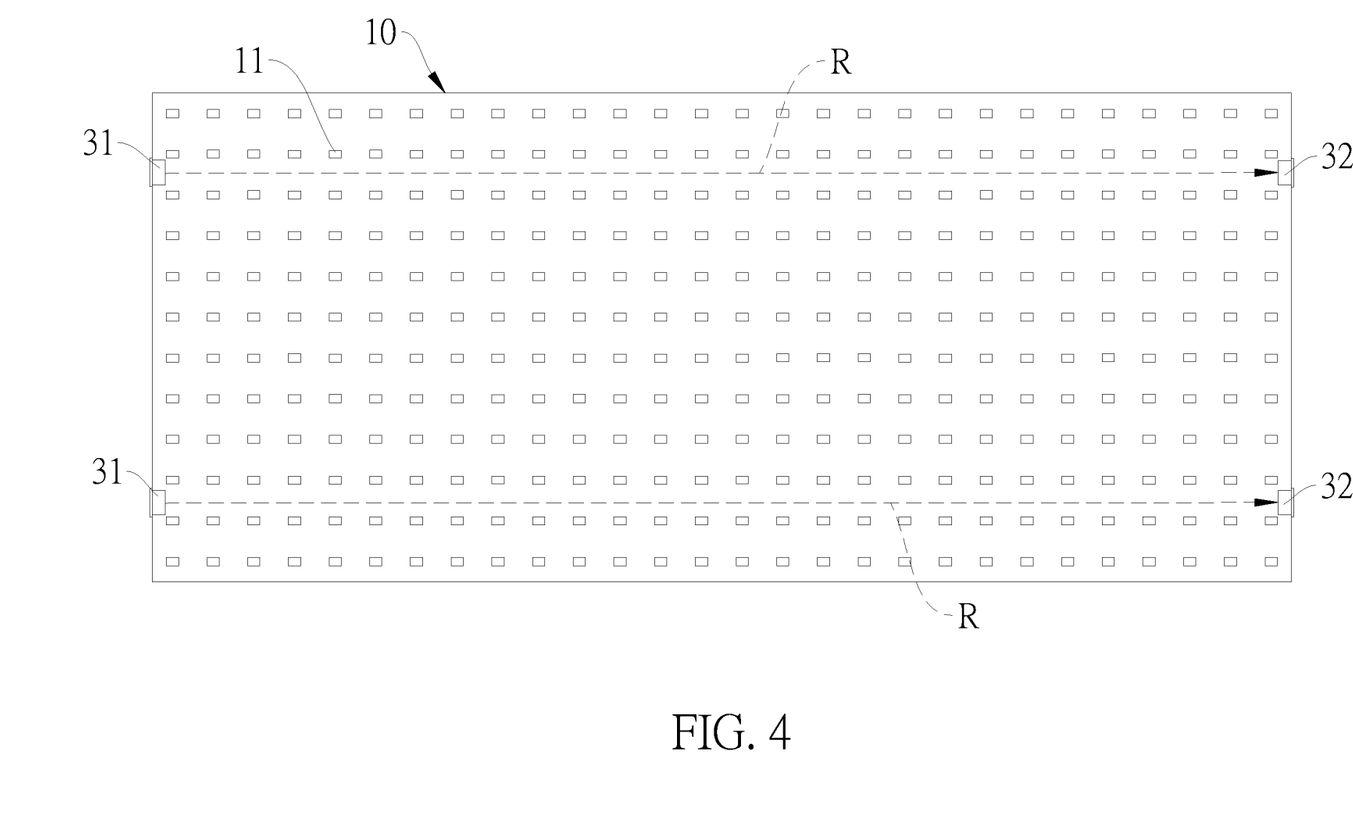
FIG. 4 is a schematic diagram showing the first configuration of the sensing mechanism of the lighting device of plant growth of the present disclosure.
Figure 5:
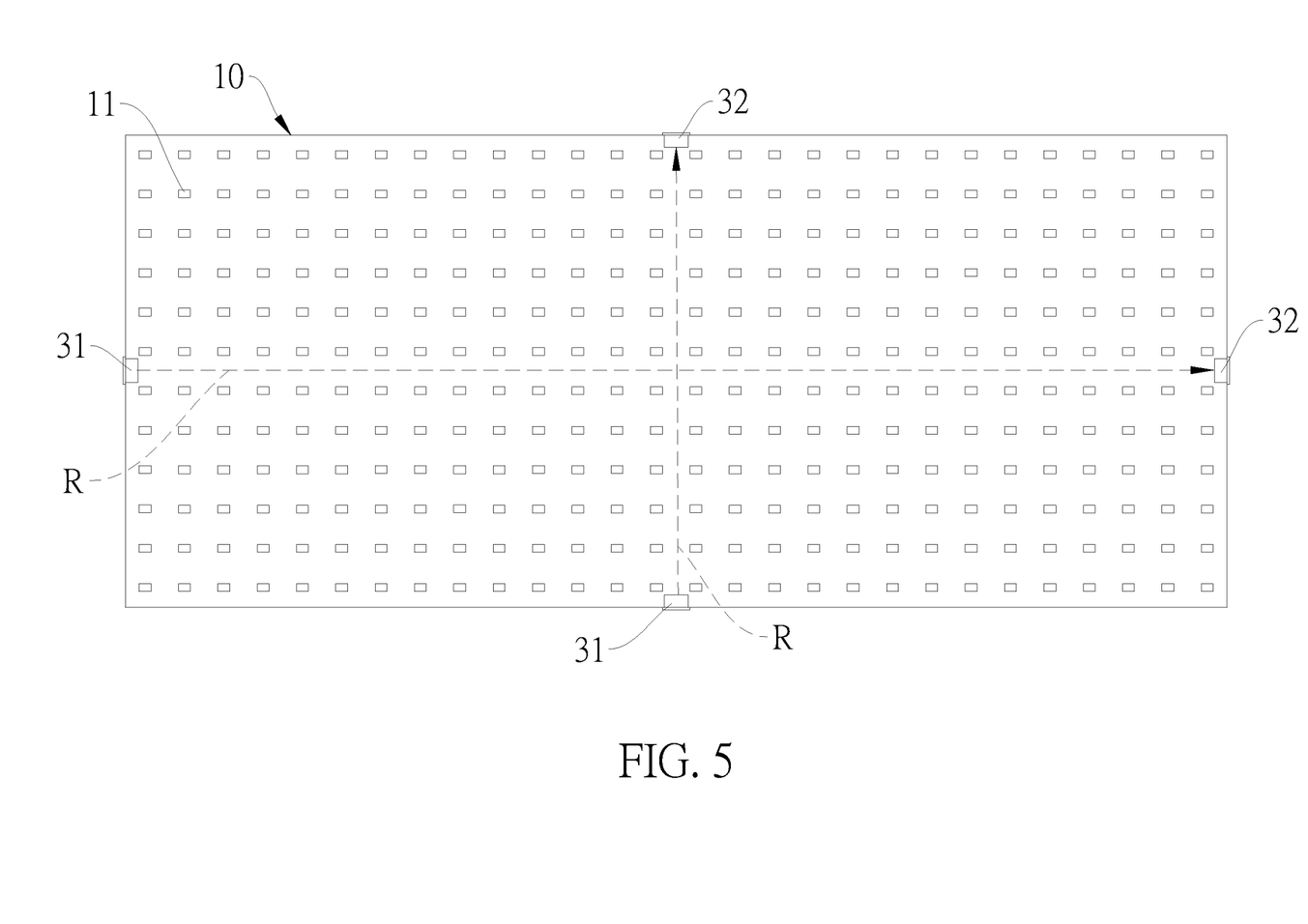
FIG. 5 is a schematic view showing the second configuration of the sensing mechanism of the lighting device for plant growth of the present disclosure.
Figure 6:
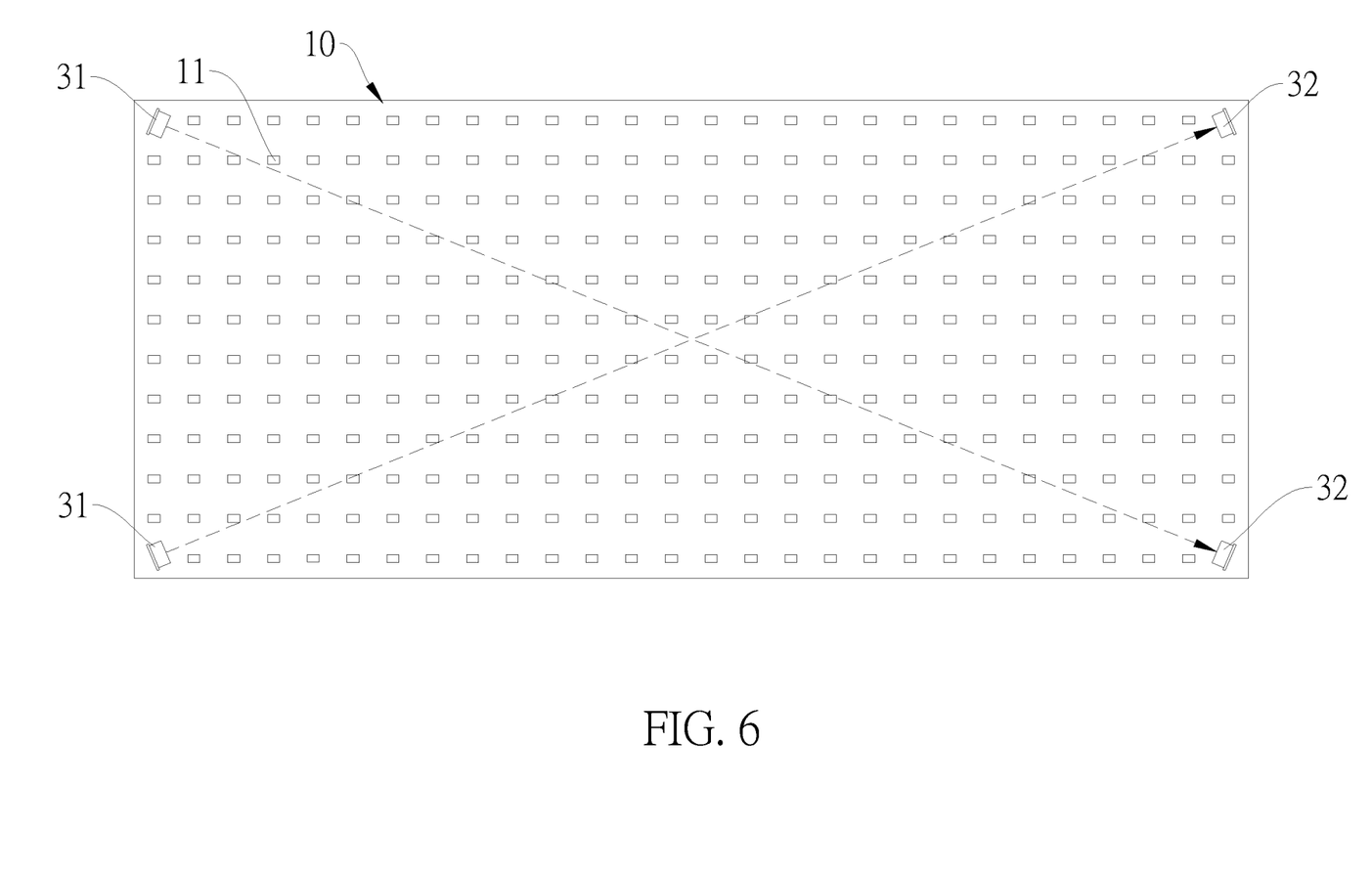
FIG. 6 is a third schematic view showing the sensing mechanism of the lighting device for plant growth of the present disclosure.

The at least two sensing mechanisms 30 are disposed at the bottom of the lamp 10 and the sensing mechanisms 30 and the light-emitting module 11 have a longitudinal separation distance. The longitudinal separation distance is 20 cm preferably. Each of the sensing mechanisms 30 has a transmitter 31 and a receiver 32 arranged with a space therebetween. The transmitter 31 may transmit signals and the signal is received by the receiver 32 so that the transmitter 31 and the receiver 32 may form a signal sensing path R therebetween so that object detection may be performed via the signal sensing path R. In a preferred configuration, two adjacent transmitters 31 have a spacing of at least 10 cm therebetween. The at least two sensing mechanisms 30 may be arranged on and not limited to the same horizontal line or different horizontal lines; and the configuration of the transmitter 31 and the receiver 32 of each of the sensing mechanisms 30 may be referred to FIG. 4 to FIG. 6. As shown in FIG. 4, after the transmitter 31 and the receiver 32 of the sensing mechanism 30 are arranged as shown, the signal sensing path R of each sensing mechanism 30 is parallel to each other. The other configuration is that when the number of the sensing mechanisms 30 is in even number, the signal sensing path R of each two of the sensing mechanisms 30 forms an aspect of mutually perpendicular as shown in FIG. 5. In another configuration, as shown in FIG. 6, when the number of the sensing mechanisms 30 is in even number, the signal sensing paths R of the two sensing mechanisms 30 are mutually intersected. For plants that are elongated such as corns, due to its elongated shape that may easily avoid sensing, mutual intersected configuration for setting the signal sensing path R may the best.

The control mechanism 40 is coupled to the lamp 10, the lifting mechanism 20 and each of the sensing mechanisms 30. The control mechanism 40 may be used to control the lamp 10 to emit light and drive various mechanisms to operate. The most important thing is when the sensing mechanisms 30 operate to form the signal sensing path R and the plant is detected in the signal sensing path R to generate a sensing signal, the control mechanism 40 may drive the lifting mechanism 20 to operate according to the sensing signal to control the lamp 10 to be displaced longitudinally such that the plant is kept at a distance from the lamp 10.

Figure 3:
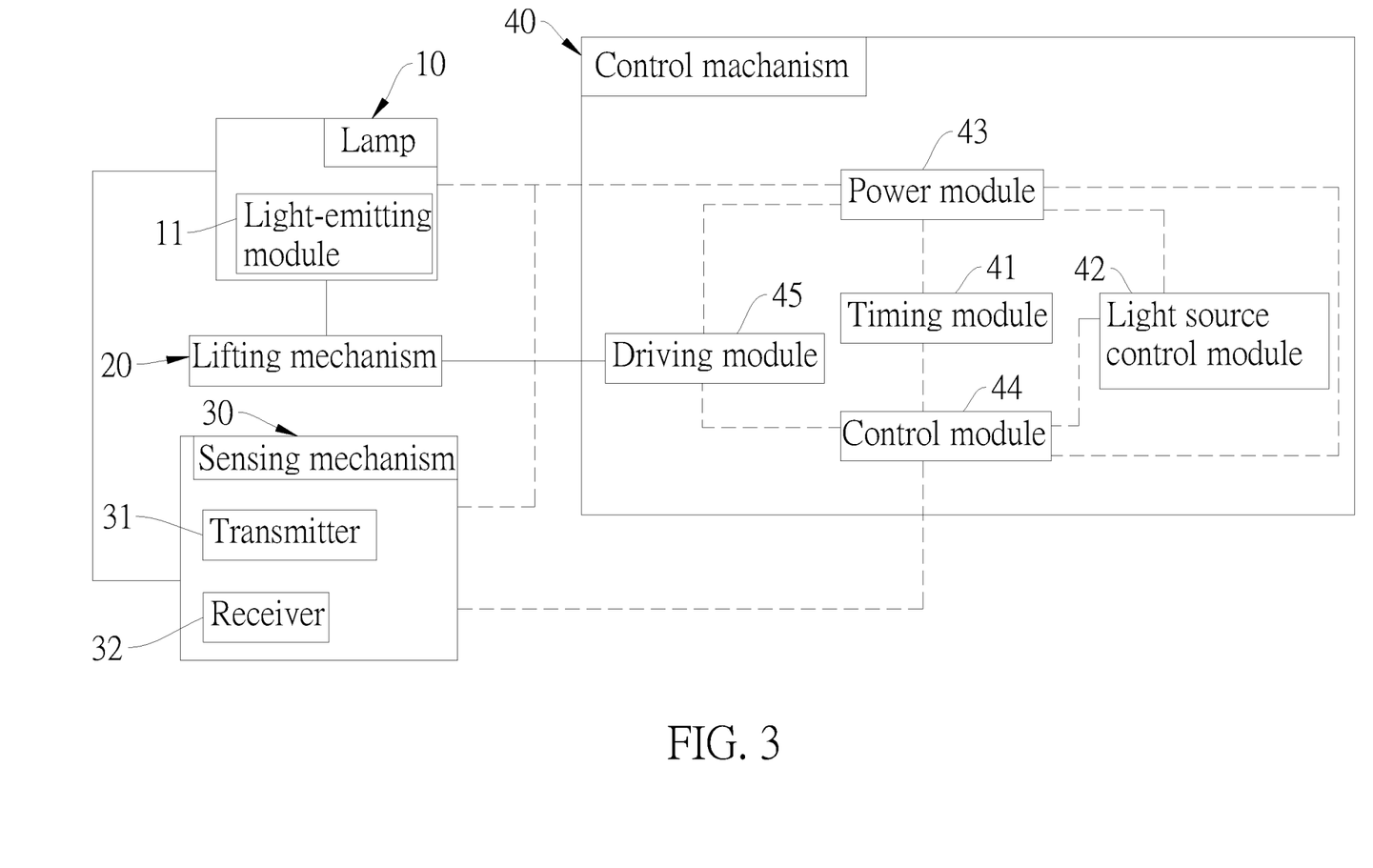
FIG. 3 is a block diagram of the lighting device of plant growth of the present disclosure.

Please refer to FIG. 3, a block diagram of the lighting device for plant growth of the present disclosure is shown. As shown in the figure, the control mechanism 40 further comprises a timing module 41, a light source control module 42, a power module 43, a control module 44, and a driving module 45. The power module 43 is electrically coupled to the lamp 10, the sensing mechanisms 30, the timing module 41, the light source control module 42, the control module 44, and the driving module 45. The control module 44 is electrically coupled to the lamp 10, the sensing mechanisms 30, the timing module 41, the light source control module 42 and the driving module 45; and the driving module 45 is coupled to the lifting mechanism 20.

In view of the above, the timing module 41 may separately set the on and off time for each sensing mechanism 30. When the on or off time is reached, the timing module 41 may generate a timed trigger signal and transmit to the control module 44 so that the control module 44 may activate or deactivate each of the sensing mechanisms 30 according to the timed trigger signal. When the sensing mechanisms 30 operate and generate the sensing signal, the control module 44 may be used to receive the sensing signal returned by the sensing mechanisms 30. The light source control module 42, via the control module 44, controls the trigger-able signal to adjust the light source emitted by the light-emitting module 11 of the lamp 10 including the intensity and the color of the light. The power module 43 may be used to provide the power required by each mechanisms and each modules. When the control module 44 receives the sensing signal, the driving module 45 will be controlled by the control module 44 to drive the lifting mechanism 20 to operate so that the lamp 10 may be longitudinally displaced.

Figure 7:
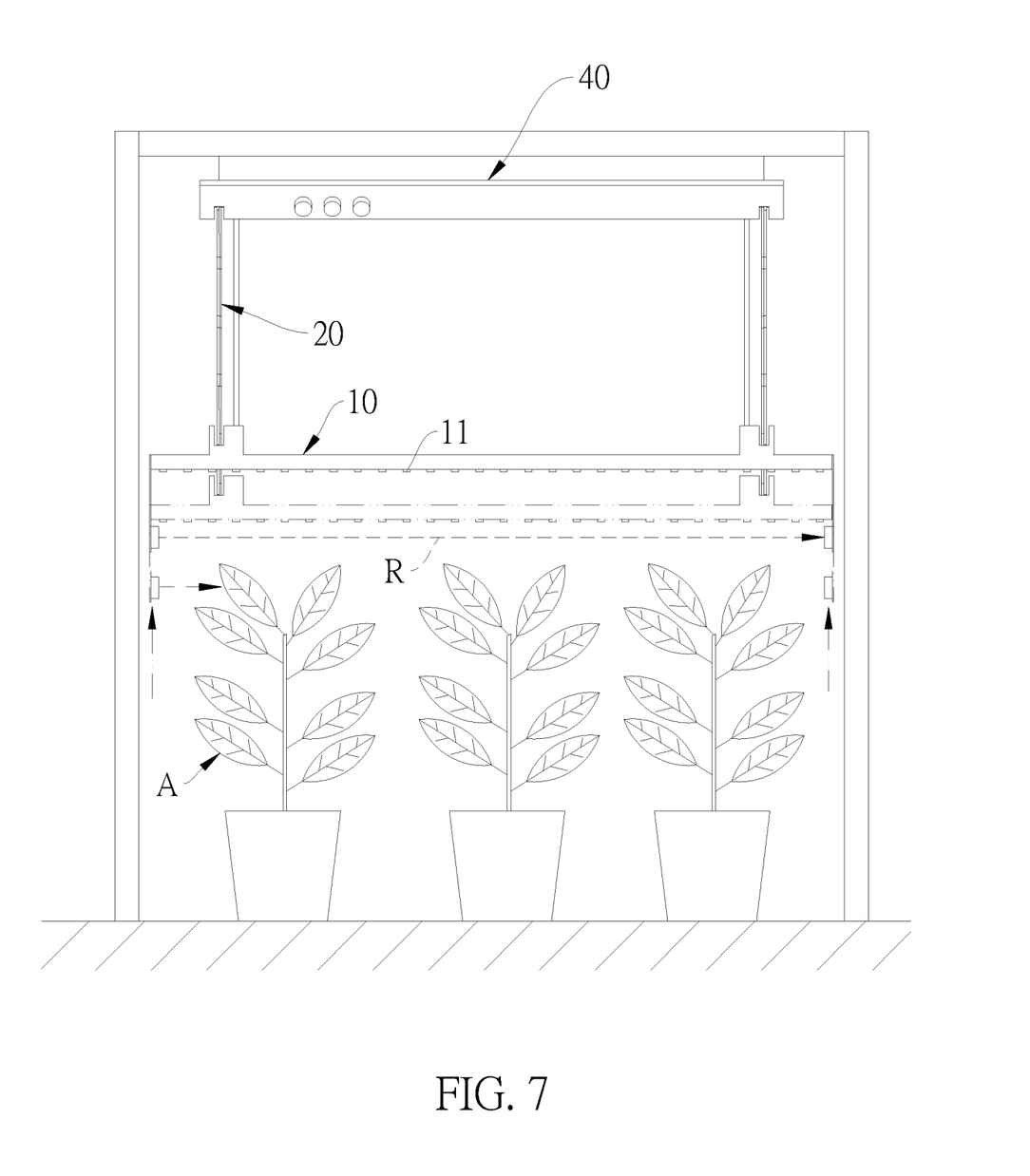
FIG. 7 is a schematic illustration of an embodiment of a lighting device for plant growth of the present disclosure.

Again, please refer to FIG. 7. It is a schematic diagram of an embodiment of the lighting device for plant growth of the present disclosure. As shown in the figure, the lighting device for plant growth may be arranged above the cultivated plant A. At the initial stage, the distance between the sensing mechanism 30 and the plant A may be kept as the same as the separation distance between the sensing mechanism 30 and the light-emitting module 11. In short, when the distance between the sensing mechanism 30 and the light-emitting module 11 is 20 cm, the separation distance between the sensing mechanism 30 and the plant A is also set at 20 cm so that plant A may obtain good light effects. When the plant A grows to a stage that enters the signal sensing path R generated between the transmitter 31 and the receiver 32, the control module 44 receives the signal sensing path R and the control module 44 controls the driving module 45 to drive the lifting mechanism 20 to a predetermined height, so that the lifting mechanism 20 operates to lift the lamp 10 upward in order for the sensing mechanism 30 and the plant A return to the distance kept at the initial stage. By maintaining the distance therebetween, the lamp 10 may follow the growth of the plant A to provide the most suitable light source for the plant A steadily.

Specifically, the lighting device for plant growth of the present disclosure utilizes the technique of timed sensing to automatically control the longitudinal displacement of the lamp, the following effects may be obtained:

1. The lighting conditions required by plants at different growth stages may be provided.

2, The energy costs may be relatively reduced.

3, There is no limitation imposed by the height of the plant. Different type of plants may be chosen.

4. The uncertain factors such as human interference and shading of branches and leaves may be reduced to avoid lifting up the lamps abnormally.

5. A more accurate determination of the height of the plants in the plant growth area to ensure that the lamps are lifted correctly.

6. When the sensing mechanism is not activated, the plants can be irradiated at a higher intensity due to the proximity of the light source, so that the light intensity the plants receive is with variation just as if the light at outdoors in order for the plants to have unpredictable growth effects. It is easy to produce products with high economic value such as secondary metabolites.

In conclusion, it may be seen that this disclosure has achieved the desired effect compared to the previous technology, and it is not non-obvious for people ordinarily skilled in the art to think about it. Moreover, this disclosure has not been disclosed before the application and it has novelty and applicability. The present disclosure has complied with the patent application requirements and the patent application is filed accordingly to the Patent Act. An allowance is kindly requested to approve the present disclosure to promote inventiveness.

The embodiments described above are merely illustrative of the technical spirit and characteristics of the present disclosure, and the purpose thereof is to enable those skilled in the art to understand the contents of the present disclosure and implement them according to the scope of the patent. That is, the equivalent changes or modifications made by the people in accordance with the spirit revealed by this creation should still be shielded by the scope of this disclosure.

What is claimed is:

1. A lighting device for plant growth suitable for the growth of a plant, wherein the lighting device for plant growth comprises:
    a lamp having a light-emitting module on a bottom surface thereof;
    a lifting mechanism connecting a top surface of the lamp;
    at least two sensing mechanisms disposed at the bottom of the lamp, the sensing mechanisms and the light-emitting module having a longitudinal separation distance therebetween, each of the sensing mechanisms having a transmitter and a receiver configured with displacement, and a signal sensing path being formed between the transmitter and the receiver, wherein two adjacent transmitters having a distance of at least 10 cm therebetween;
    a control mechanism being coupled to the lamp, the lifting mechanism and each of the sensing mechanisms, and the control mechanism comprising a timing module, the control mechanism for activating or deactivating each of the sensing mechanisms according to a timed trigger signal generated by the timing module, when the sensing mechanism operating to form the signal sensing path and sensing the plant to generate a sensing signal, the control mechanism driving the lifting mechanism according to the sensing signal to control the longitudinal displacement of the lamp.

2. The lighting device for plant growth according to claim 1, wherein the at least two sensing mechanisms are arranged on the same horizontal line.

3. The lighting device for plant growth according to claim 2, wherein the signal sensing paths of each of the sensing mechanisms are parallel to each other.

4. The lighting device for plant growth according to claim 2, wherein the number of the sensing mechanisms is in even number, and the signal sensing paths for each two of the sensing mechanisms are perpendicular to each other.

5. The lighting device for plant growth according to claim 2, wherein the number of the sensing mechanisms is in even number and the signal sensing paths for each two of the sensing mechanisms are mutually intersecting.

6. The lighting device for plant growth according to claim 1, wherein the at least two sensing mechanisms are disposed on different horizontal lines.

7. The lighting device for plant growth according to claim 6, wherein the signal sensing paths of each of the sensing mechanisms are parallel to each other.

8. The lighting device for plant growth according to claim 6, wherein the number of the sensing mechanisms is in even number and the signal sensing paths of each two of the sensing mechanisms are perpendicular to each other.

9. The lighting device for plant growth according to claim 6, wherein the number of the sensing mechanisms is in even number and the signal sensing paths of each two of the sensing mechanisms are mutually intersecting.

10. The lighting device for plant growth according to claim 1, wherein the control mechanism further comprises a light source control module coupled to the lamp to adjust the intensity of the light emitted by the light-emitting module.

11. The lighting device for plant growth according to claim 10, wherein the control mechanism further comprises: a power module connecting to the lamp, the sensing mechanism, and the timing module and the light source control module; a control module connecting the lamp, the sensing mechanism, the timing module, the light source control module and the power module, the control module being capable of receiving the timed trigger signal to activate or deactivate each of the sensing mechanisms, and the control module being capable of receiving a signal of the light source control module to adjust and control the light of the light-emitting module; and a driving module coupled to the power module, the control module and the lifting mechanism, when the control module receiving the sensing signal, the driving module being controlled by the control module to drive the lifting mechanism to operate.

12. The lighting device for plant growth according to claim 1, wherein the light-emitting module comprises at least one light emitting diode.

13. The lighting device for plant growth according to claim 12, wherein the light-emitting diodes are in plurality, and each of the light emitting diodes radiates at different wavelengths.

14. The lighting device for plant growth according to claim 13, wherein the control mechanism further comprises a light source control module coupled to the lamp to adjust the intensity of the light emitted by the light-emitting module.

15. The lighting device for plant growth according to claim 12, wherein the light-emitting diodes are in plurality and each of the light emitting diodes radiates at same wavelength.

16. The lighting device for plant growth according to claim 15, wherein the control mechanism further comprises a light source control module coupled to the lamp to adjust the intensity of the light emitted by the light-emitting module.

17. The lighting device for plant growth according to claim 12, wherein the light emitting diode radiates an ultraviolet light.

18. The lighting device for plant growth according to claim 17, wherein wavelength of the ultraviolet light is between 280 nm and 400 nm.

19. The lighting device for plant growth according to claim 18, wherein the control mechanism further comprises a light source control module coupled to the lamp to adjust the intensity of the light emitted by the light-emitting module.

20. The lighting device for plant growth according to claim 19, wherein the control mechanism further comprises: a power module connecting the lamp, the sensing mechanism, the timing module and the light source control module; a control module connecting the lamp, the sensing mechanism, the timing module, the light source control module and the power module, the control module being capable of receiving the timed trigger signal to activate or deactivate each sensing mechanism, and the control module being capable of receiving a signal of the light source control module to adjust the light of the light-emitting module; and a driving module coupled to the power module, the control module and the lifting mechanism, when the control module receiving the sensing signal, the driving module being controlled by the control module to drive the lifting mechanism to operate.

* * * * *